No. 784,212. PATENTED MAR. 7, 1905.
M. HIRTH.
HOSE COUPLING.
APPLICATION FILED AUG. 26, 1904.
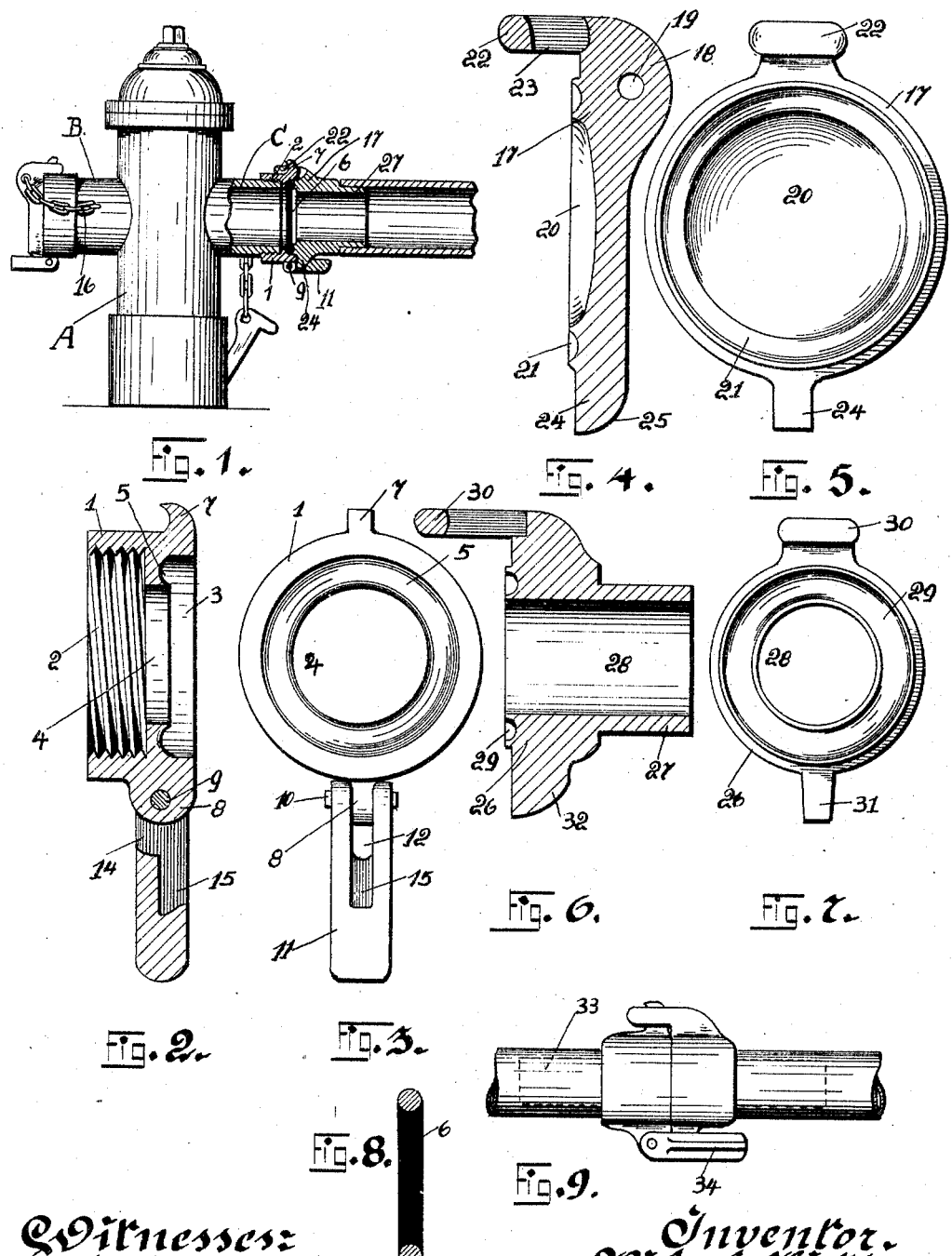
Witnesses:
C. Klostermann
F. H. Butler
Inventor.
Michael Hirth.
by
A. E. Evert & Co.
Attorneys.

No. 784,212.

Patented March 7, 1905.

UNITED STATES PATENT OFFICE.

MICHAEL HIRTH, OF BUTLER, PENNSYLVANIA.

HOSE-COUPLING.

SPECIFICATION forming part of Letters Patent No. 784,212, dated March 7, 1905.

Application filed August 26, 1904. Serial No. 222,218.

*To all whom it may concern:*

Be it known that I, MICHAEL HIRTH, a citizen of the United States of America, residing at Butler, in the county of Butler and State of Pennsylvania, have invented certain new and useful Improvements in Hose-Couplings, of which the following is a specification, reference being had therein to the accompanying drawings.

This invention has relation to hose-couplers, and more particularly to that class which are employed for connecting a line of hose to a hydrant or fire-plug; and the object of this invention is the provision of novel means whereby a line of hose may be quickly and easily coupled to the discharge spout or pipe of a hydrant or fire-plug.

Another object of this invention is to provide a coupling which may be readily used for connecting two sections of hose together, and in constructing my improved couplings I have embodied such features of construction whereby the manipulation of the coupling will be extremely simple and the construction strong and durable.

Briefly described, my improved coupling comprises two members and a cap, and the first member is constructed whereby it may be readily secured upon the discharge spout or pipe of a hydrant or fire-plug or upon the end of a section of hose and the other member is adapted to be secured to a section of hose, and the member is adapted to fit within the first member, novel means being provided for first hinging the one member to the other and then locking said members together. The first member is adapted to be placed upon fire hydrants or plugs and become a fixed member, and in order to close the end of the discharge pipe or spout I have provided a novel form of cap which is adapted to be secured to the end of the discharge-pipe in a manner similar to what a section or line of hose would be secured.

In constructing my improved pipe-coupling I have provided novel means whereby the same will be non-leakable, and the members comprising the coupling are so formed that they may be readily cast or machined and the expense of manufacture reduced to a minimum.

The above construction will be hereinafter described in detail and then particularly pointed out in the claims, and referring to the drawings accompanying this application similar reference characters designate corresponding parts throughout the several views, in which—

Figure 1 is a side elevation of a fire hydrant or plug, showing one discharge-pipe closed with my improved cap and the other discharge-pipe in longitudinal section, illustrating a section of hose connected thereto. Fig. 2 is a vertical sectional view of the member which is adapted to be secured to the discharge-pipe of the hydrant and become a fixed element. Fig. 3 is a front view of the same. Fig. 4 is a vertical sectional view of a cap employed to close the discharge-pipe of a hydrant or plug. Fig. 5 is a rear view of the same. Fig. 6 is a vertical sectional view of the member of the coupling which is adapted to be carried by a section or line of hose. Fig. 7 is a rear view of the same. Fig. 8 is a detail vertical sectional view of a gasket, and Fig. 9 is a side elevation of the two members secured together when said members are employed upon sections of hose.

To put my invention into practice, I employ an ordinary fire hydrant or plug A, said plug having discharge pipes or spouts B and C, and upon the end of each discharge-pipe B and C, I secure the member 1 of my improved coupling. This member is annular in form, as clearly shown in Fig. 3 of the drawings, and the one face thereof is provided with a screw-threaded recess 2, while the other face thereof is provided with an annular recess 3, and a communicating opening 4 is provided between the recess 2 and the recess 3, said opening 4 being of a smaller diameter than the recess 3, and surrounding said opening 4 and in the recess 3 I provide an annular groove 5, in which is adapted to be placed an annular gasket 6, said gasket being made of rubber or a suitable flexible material. Upon the periphery of the member 1 I provide a hook-shaped lug 7, and diametrically opposite said lug and upon the periphery of the member 1 I form a depending lug 8, which is provided with an aperture 9, and hinged to said lug by a pin 10 is a lever 11, said lever being bifurcated, as indicated at 12, whereby the sides of the lever may be hinged to the lug 8. In bifurcating the lever 11 said lever is cut away, as designated at 14, whereby said lever may be swung at a right angle to the member 1, and adjacent to said cut-away portion the lever is provided with another recess or cut-away portion, 15, the object of which will be hereinafter more fully described.

The screw-threaded aperture 2 of the member 1 is provided whereby the same may be secured upon the screw-threaded end of the discharge-pipe C or B, and the member 1 is adapted to become a fixed element or stationary adjunct to the hydrant or fire-plug, and in order to close the end of the discharge-pipe I have secured to each of the pipes B and C a chain 16, and upon the end of the chain is attached a cap 17, reference now being had to Figs. 4 and 5 of the drawings. In these views I have illustrated the particular construction of the cap employed to close the discharge-pipes B and C, and this cap is preferably made annular in form and upon its confronting face and near its periphery is provided with a lug or enlarged portion 18, which is provided with an aperture 19, whereby the loose end of the chain 16 may be secured in said aperture to at all times retain the cap in the vicinity of the fire-plug or hydrant. The cap 17 upon its inner face is provided with a central annular concavity 20, and surrounding said concavity is an annular groove 21. The periphery of the cap adjacent to the enlarged portion 18 is provided with an outwardly-extending lug 22, which has formed therein an orifice 23. Diametrically opposite the lug 22 and formed integral with the cap is a depending lug 24, said lug being provided with a cam-surface 25. When the hydrant or plug is not in use, the cap is secured upon the end of the discharge pipe or spout in the following manner: The lug 22, having formed therein an orifice 23, is placed over the hook-shaped lug 7 of the member 1, and the cap 17 is then forced downwardly over the opening of the discharge-pipe, and the lever 11 is drawn upwardly to engage the depending lug 23, and as said lever engages the lug the same will ride upon the cam-surface 25 of said lug and force the cap into engagement with the member 1, compressing the gasket 6 and forming a non-leakable closure-cap for the hydrant. When it is desired to remove the cap, the lever 11 is knocked or forced downwardly and the expansion of the gasket 6 will force the cap outwardly sufficient to permit of the easy removal of the lug 22 from the lug 7, and the cap may be then released and permitted to hang in the position shown in Fig. 1 of the drawings.

Reference will now be had to the member which is adapted to be carried by the section of loose hose, and it will be first described as being adapted to be connected to the discharge-pipes B or C of the plug or hydrant A. The member 26, as illustrated in Figs. 4 and 5 of the drawings, is annular in form and is provided with a collar 27, and in said member is provided an opening 28 of a diameter approximately the same as the diameter of the discharge-pipes B and C of the hydrant. In the inner face of the member 27 and surrounding the opening 28 is an annular groove 29. Upon the periphery of the member 26 is provided an orificed lug 30, which is similar in construction to the lug 22, carried by the cap 17. Diametrically opposite the lug 30 and formed integral with the periphery of the member 26 is the depending lug 31, having a cam-surface 32, said lug being similar to the lug 24, heretofore described.

In Fig. 1 of the drawings I have illustrated a section of hose as being secured upon the collar 27 of the member 26, and while I have not shown any specific means of securing the section of hose thereon I wish it to be understood that I may employ the ordinary and well-known means now commonly used. In the same figure I have illustrated the member 26 as being secured to the member 1, and the operation described for securing the cap 17 upon this member is applicable to the member 26.

In Fig. 9 of the drawings I have illustrated two sections of hose wherein the members 1 and 26 are applied thereto, and when the member 1 is to be used in connection with two sections of hose the same is provided or formed with a collar 33, similar to the collar 27, this collar 33 being shown in dotted lines in Fig. 9. The remainder of the construction of the member 1 is identical with that heretofore described, and it can be readily seen in this figure the exact position the two members will assume when coupled together. It will also be observed from this figure that each side of the lever 11 is provided with a rib 34, whereby the lever may be readily gripped or manipulated with a wrench, and I intend to form the cam-surfaces 25 and 32, whereby when the cut-away portion 15 of the lever 11 engages said cam-surfaces it will force the member 26 or the cap 17 into engagement with the member 1 and lock the same thereon.

While I have herein shown and particularly described the coupling as applicable to fire-plugs and hydrants and to connecting two section of hose together, it is obvious that the same may be readily employed in connection with pipes of any character and I wish it to be understood that the shape or contour of the different parts may be changed without departing from the spirit of the invention.

Having fully described my invention, what I claim, and desire to secure by Letters Patent, is—

1. The combination with a hydrant having a discharge-pipe on its side, of a removable member mounted on said pipe, a member carried by a section of hose and adapted to fit the member on the pipe, a cap attached to the hydrant, means carried by the member on the pipe for securing the two members together, said means being also adapted to secure the cap against the end of the member on the pipe.

2. The combination with a hydrant, of a member secured to said hydrant, a cap suspended from said hydrant, a member secured to a section of hose, means for hinging said member to the first-named member, means carried by the member on the hydrant for locking said members together, said locking means being adapted to lock said cap upon the first-named member when the last-named member is removed.

3. A coupling comprising two members, one member having a beveled lug on one side and a pierced lug on the other side, the other of said members having a lug on one side adapted to enter the pierced lug on the other member, and a pivoted locking-lever on the other side, said locking-lever being formed with a cut-away portion adapted to engage the beveled lug of the other member.

4. The combination with a hydrant having an integral threaded spout on one side, of a coupling member screwing on said spout, said coupling member having a rearwardly-curved lug on one side and a pivoted lever, having an undercut recess in its face, on the other side, and a second coupling member having a pierced lug on one side and a lug with a cam-surface on the other side, said last-named lug entering the recess in said lever when the two members are coupled together.

5. The combination with a hydrant having an integral threaded spout on each side and a coupling member screwing on each said spout, each coupling member having a rearwardly-curved lug on one side and carrying a pivoted lever having an undercut recess on its face, on the other side a coupling member carried by a hose and having a pierced lug on one side and a lug with a cam-surface on the other side, said pierced lug extending in alinement with the longitudinal axis of the member and the lug with a cam-surface entering the recess in the lever of one of the coupling members on the hydrant, and said hydrant being provided with a plurality of caps adapted to fit over and close the coupling members thereon when the said coupling members are not engaged by the member on the hose.

In testimony whereof I affix my signature in the presence of two witnesses.

MICHAEL HIRTH.

Witnesses:
   E. E. POTTER,
   K. H. BUTLER.